United States Patent
Pattok et al.

(10) Patent No.: US 9,828,024 B2
(45) Date of Patent: Nov. 28, 2017

(54) POWER STEERING SYSTEM

(71) Applicant: Steering Solutions IP Holding Corporation, Saginaw, MI (US)

(72) Inventors: Eric D. Pattok, Frankenmuth, MI (US); Patrik Ryne, Midland, MI (US); Joen C. Bodtker, Gaines, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 156 days.

(21) Appl. No.: 14/174,416

(22) Filed: Feb. 6, 2014

(65) Prior Publication Data
US 2014/0216844 A1 Aug. 7, 2014

Related U.S. Application Data

(60) Provisional application No. 61/761,474, filed on Feb. 6, 2013, provisional application No. 61/761,477, filed on Feb. 6, 2013.

(51) Int. Cl.
*B62D 7/08* (2006.01)

(52) U.S. Cl.
CPC ................................ *B62D 7/08* (2013.01)

(58) Field of Classification Search
CPC . B60D 7/00; B60D 7/166; B60D 7/20; B60D 5/0403; B60D 5/0463; B62D 7/00; B62D 7/166; B62D 7/20; B62D 5/0403; B62D 5/0463; B62D 7/08
USPC ......... 180/439, 438, 444; 280/93.507, 93.51, 280/93.502
See application file for complete search history.

(56) References Cited

U.S. PATENT DOCUMENTS

| | | | | |
|---|---|---|---|---|
| 2,095,566 A | * | 10/1937 | Lundelius | B62D 7/00 280/93.507 |
| 3,051,257 A | * | 8/1962 | Selle | A01B 69/007 180/24.01 |
| 3,887,211 A | * | 6/1975 | Mazur | B62D 7/16 280/86.758 |

(Continued)

FOREIGN PATENT DOCUMENTS

| | | |
|---|---|---|
| CN | 101999200 A | 3/2011 |
| CN | 102849105 A | 1/2013 |

(Continued)

OTHER PUBLICATIONS

Communication including partial search report regarding related EP App. No. 14154127.6-1755, dated May 19, 2014; 7 pgs.

(Continued)

*Primary Examiner* — Anne Marie M Boehler
(74) *Attorney, Agent, or Firm* — Cantor Colburn LLP

(57) ABSTRACT

A power steering system includes a first linkage arm pivotally coupled to a cross-link member extending in a transverse direction. Also included is a first shaft generally orthogonal to the first linkage arm and configured to rotate the first linkage arm. Further included is a second linkage arm pivotally coupled to the cross-link member with a pivot location. The power steering system yet further includes an electric actuator. Also included is a linkage member extending from the electric actuator and operatively coupled to an assist portion of the second linkage arm to reduce the steering effort required by a driver of the vehicle.

7 Claims, 6 Drawing Sheets

(56) References Cited

U.S. PATENT DOCUMENTS

| | | | | |
|---|---|---|---|---|
| 4,064,967 | A | * 12/1977 | Doolittle | B62D 7/12 180/435 |
| 4,364,578 | A | * 12/1982 | Ikeda | B62D 7/10 280/93.507 |
| 4,518,170 | A | * 5/1985 | Musgrove | B62D 3/02 180/426 |
| 8,789,646 | B2 | * 7/2014 | Kim | B62D 7/12 180/433 |
| 2004/0113575 | A1 | 6/2004 | Matsuoka et al. | |
| 2005/0159866 | A1 | 7/2005 | Takeuchi et al. | |
| 2010/0276901 | A1 | 11/2010 | Richardson et al. | |
| 2011/0031805 | A1 | 2/2011 | Yamashita et al. | |
| 2011/0074333 | A1 | 3/2011 | Suzuki | |
| 2011/0156627 | A1 | 6/2011 | Nakamura et al. | |
| 2014/0214277 | A1 | 7/2014 | Brenner | |
| 2014/0222292 | A1* | 8/2014 | Fisher | B62D 5/046 701/41 |

FOREIGN PATENT DOCUMENTS

| | | | | |
|---|---|---|---|---|
| DE | 102005044875 | A1 | 10/2006 | |
| EP | 0771717 | * | 5/1997 | B62D 7/20 |
| EP | 2450259 | A1 | 5/2012 | |
| FR | 1213206 | * | 6/2002 | B62D 7/20 |
| FR | 2862937 | * | 6/2015 | B62D 5/04 |
| JP | 2501522 | * | 4/1996 | B62D 7/20 |
| WO | 2012052817 | A1 | 4/2012 | |

OTHER PUBLICATIONS

Mitcham, A. et al., "Favourable slot and pole number combinations for fault-tolerant PM machines," Sep. 9, 2004, Electric Power Applications, IEEE Proceedings, vol. 151 Issue 5, pp. 520-521.
Office Action regarding related CN Application No. 201410107913.3; dated Nov. 3, 2015; 7 pgs.

* cited by examiner

POWER STEERING SYSTEM

CROSS-REFERENCES TO RELATED APPLICATIONS

This patent application claims priority to U.S. Provisional Patent Application Ser. No. 61/761,474, and U.S. Provisional Patent Application Ser. No. 61/761,477, both filed Feb. 6, 2013, and both of which are incorporated herein by reference in their entirety.

BACKGROUND OF THE INVENTION

Various linkage arrangements are employed on vehicles to facilitate power assisted steering. One type of linkage is commonly referred to as a "parallelogram" steering linkage with a hydraulic configuration for power assisted steering. Such a linkage arrangement is commonly used on heavy duty trucks, for example.

Attempts have been made to effectively integrate electric power steering (EPS) into a "parallelogram" steering linkage architecture. Typically, a manual driver command and an electric power assist reach the linkage structure at the same location in the manner of torque. The torque is added at this location through a rack and pinion interface in an integral gear. However, the tooth pressure at this interface is significant and an adjustment mechanism may be required to periodically remove the lash at that interface. Various other components have been considered to effectively integrate EPS, such as planetary gear sets, worm and worm gears, and harmonic drives. Unfortunately, the efficiency is low for these components and the space available in the vehicle makes it impractical to place reduction mechanisms in the necessary interface location.

SUMMARY OF THE INVENTION

In accordance with an exemplary embodiment of the invention, a power steering system includes a first linkage arm pivotally coupled to a cross-link member extending in a transverse direction. Also included is a first shaft generally orthogonal to the first linkage arm and configured to rotate the first linkage arm. Further included is a second linkage arm pivotally coupled to the cross-link member with a pivot location. The second linkage arm includes a power portion extending from a first end of the second linkage arm to the pivot location. The second linkage arm also includes an assist portion extending from the pivot location to a second end of the second linkage arm. The power steering system yet further includes an electric actuator. The power steering system also includes a linkage member extending from the electric actuator and operatively coupled to the assist portion of the second linkage arm to reduce the steering effort required by a driver of the vehicle.

In accordance with another exemplary embodiment of the invention, a power steering system includes a first linkage arm pivotally coupled to a cross-link member extending in a transverse direction. Also included is a first shaft generally orthogonal to the first linkage arm, the first shaft configured to rotate the first linkage arm upon a command from a driver of the vehicle. Further included is a power portion of the first linkage arm extending from a first end of the first linkage arm to the first shaft. Yet further included is an assist portion of the first linkage arm extending from the first shaft to a second end of the first linkage arm. Also included is an electric actuator. Further included is a linkage member extending from the electric actuator and operatively coupled to the assist portion of the first linkage arm.

In accordance with yet another exemplary embodiment of the invention, a power steering system includes a first linkage arm pivotally coupled to a cross-link member extending in a transverse direction of a vehicle. Also included is a second linkage arm pivotally coupled to the cross-link member. Further included is a first shaft generally orthogonal to the first linkage arm and configured to rotate the first linkage arm. Yet further included is an electric actuator. Also included is a linkage member extending from the electric actuator and directly coupled to the cross-link member.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
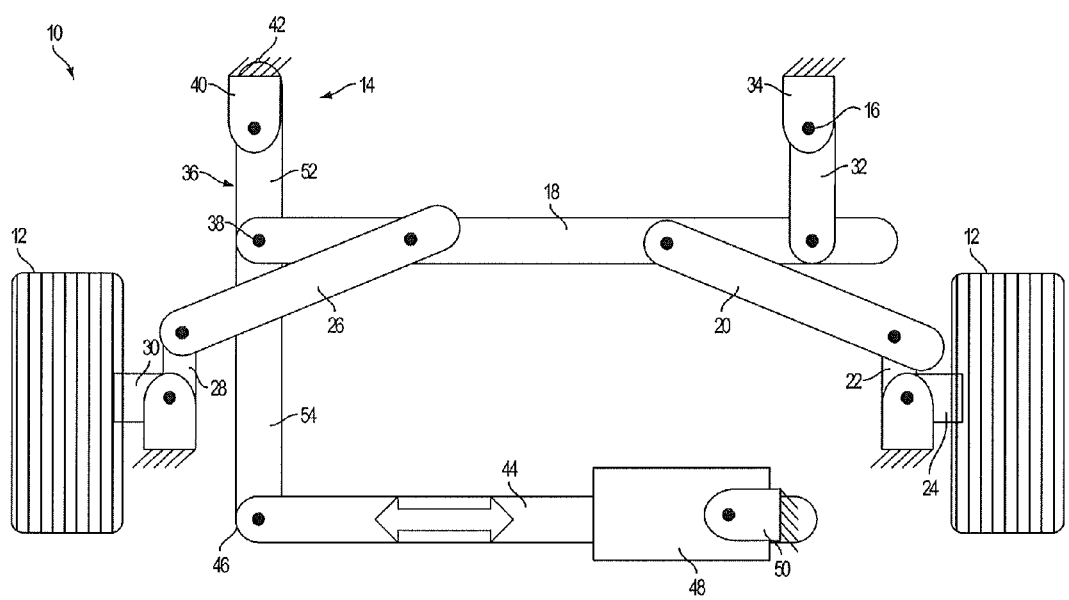
FIG. 1 is a schematic illustration of a power steering system according to one aspect of the invention.

Referring now to FIG. 1, a portion of a steering system 10 for a vehicle is schematically illustrated. The architecture of the steering system 10 is referred to as a "parallelogram" steering system. It is contemplated that the steering system 10 may be employed in numerous types of vehicles. In one embodiment, the steering system 10 is used in association with heavy duty trucks.

The steering system 10 includes numerous components, such as various linkage members, sensors, switches, and accessories. The steering system 10 transfers rotation and torque from an input member, such as a steering wheel assembly (not illustrated) to an output member, such as one or more wheels 12. The steering wheel assembly is operatively coupled to a linkage arrangement 14 of the steering system 10 with a first shaft 16, which may be referred to as a pitman shaft. The wheels 12 of the vehicle are turned through movement of the linkage arrangement 14 and, more particularly, though movement of a cross-link member 18. The cross-link member 18 extends in a substantially transverse or cross-car direction of the vehicle and translates in this direction as well. Translation of the cross-link member 18 imparts movement of numerous other components that link the cross-link member 18 to the wheels 12 of the vehicle. Such intermediary components include a first tie rod 20 rotatably coupled to the cross-link member 18, as well as one or more additional linkage members 22 that is integrally formed with a first steering knuckle 24 that pivots with respect to a frame of the vehicle. Similarly, a second tie rod 26 is rotatably coupled to the cross-link member 18 and is indirectly coupled to a wheel of the vehicle with a linkage member 28 that is integrally formed with a second steering knuckle 30 that pivots with respect to the frame of the vehicle.

In the illustrated embodiment, the linkage arrangement 14 includes a first linkage arm 32 that is pivotally coupled to the cross-link member 18 at a location proximate the first shaft 16. The first linkage arm 32 is pivotally coupled to the frame of the vehicle via a first pivot joint 34 and is free to rotate in response to an input from the first shaft 16. A second linkage arm 36 is also pivotally coupled to the cross-link member 18 at a pivot location 38. The second linkage arm 36 is pivotally coupled to the frame of the vehicle via a second pivot joint 40 proximate a first end 42 of the second linkage arm 36. The second linkage arm 36 is pivotally coupled to a linkage member 44 proximate a second end 46 of the second linkage arm 36. The linkage member 44 extends from the second linkage arm 36 to an electric actuator 48 that is operatively coupled to the frame of the vehicle. The operative coupling of the electric actuator 48 to the frame comprises a pivotal connection via a pivot joint 50. In the illustrated embodiment, the electric actuator 48 comprises a linear actuator that translates the linkage member 44 in a substantially cross-car direction of the vehicle.

The second linkage arm 36 comprises two portions. A first portion 52, which may be referred to herein as a power portion, extends from the first end 42 of the second linkage arm 36 to the pivot location 38 between the second linkage arm 36 and the cross-link member 18. A second portion 54, which may be referred to herein as an assist portion, extends from the pivot location 38 to the second end 46 of the second linkage arm 36. The second portion 54 is directly driven by the linkage member 44 that is translated with the electric actuator 48. Therefore, the electric actuator 48 provides a power steering assist to the linkage arrangement 14 via the linkage member 44 and the second portion 54 of the second linkage arm 36.

Figure 2:
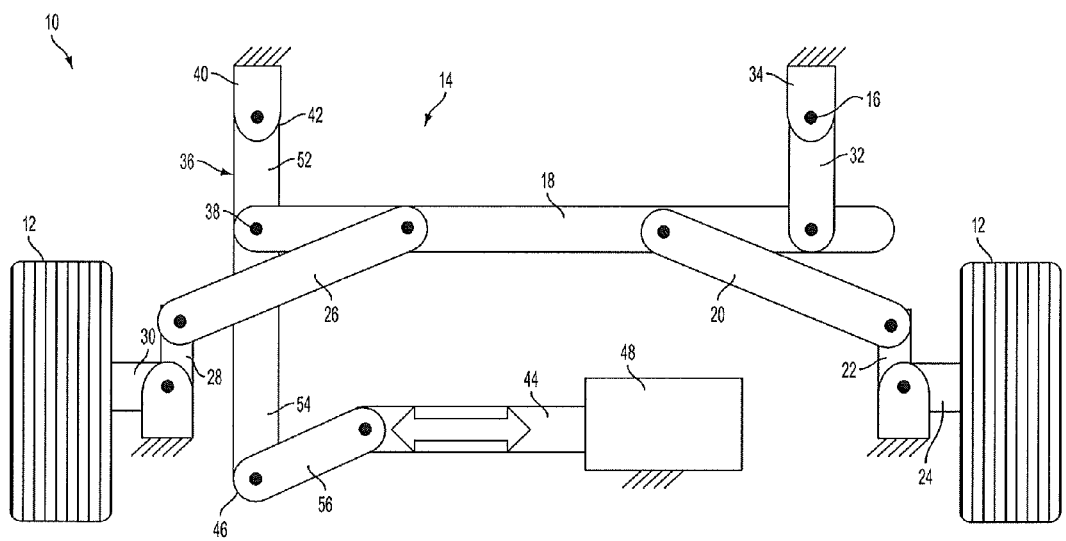
FIG. 2 is a schematic illustration of a power steering system according to another aspect of the invention.

Referring now to FIG. 2, the steering system 10 is schematically illustrated to show another exemplary embodiment. The illustrated embodiment is similar in many respects to the embodiment shown in FIG. 1, such that similar reference numerals are employed and duplicative description of the previously described components is not necessary.

The linkage arrangement 14 of the steering system 10 includes an intermediate linkage member 56 that extends between, and connects, the second linkage arm 36 and the linkage member 44 that is coupled to the electric actuator 48. The intermediate linkage member 56 is pivotally coupled to the second linkage arm 36 and the linkage member 44, thereby allowing a direct mounting of the electric actuator 48 to the frame of the vehicle.

Figure 3:
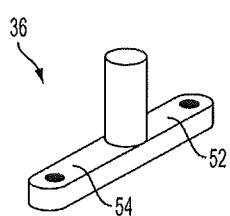
FIG. 3 is a perspective view of a linkage arm of the power steering system according to one aspect of the invention.
Figure 4:
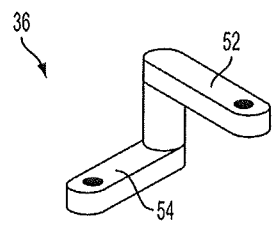
FIG. 4 is a perspective view of the linkage arm of the power steering system according to another aspect of the invention.

Referring now to FIGS. 3 and 4, with continued reference to FIGS. 1 and 2, various embodiments of the second linkage arm 36 are illustrated. The second linkage arm 36 of the exemplary embodiments of FIGS. 1 and 2 may be configured in numerous manners, with two examples shown in FIGS. 3 and 4. In particular, the first portion 52 (i.e., power portion) of the second linkage arm 36 and the second portion 54 (i.e., assist portion) of the second linkage arm 36 may be located in a common plane (FIG. 3) or may be located in distinct planes (FIG. 4). Additionally, regardless of whether the first portion 52 and the second portion 54 are located in a common or a distinct plane, the first portion 52 and the second portion 54 may be angularly displaced from each other along the entire 360 degree spectrum. The embodiment of FIG. 3 illustrates the first portion 52 and the second portion 54 angularly displaced from each other at about 180 degrees, while FIG. 4 illustrates the first portion 52 and the second portion 54 angularly displaced from each other at about 90 degrees. As noted above, the angle of displacement may be anywhere along the 360 degree spectrum.

Figure 5:
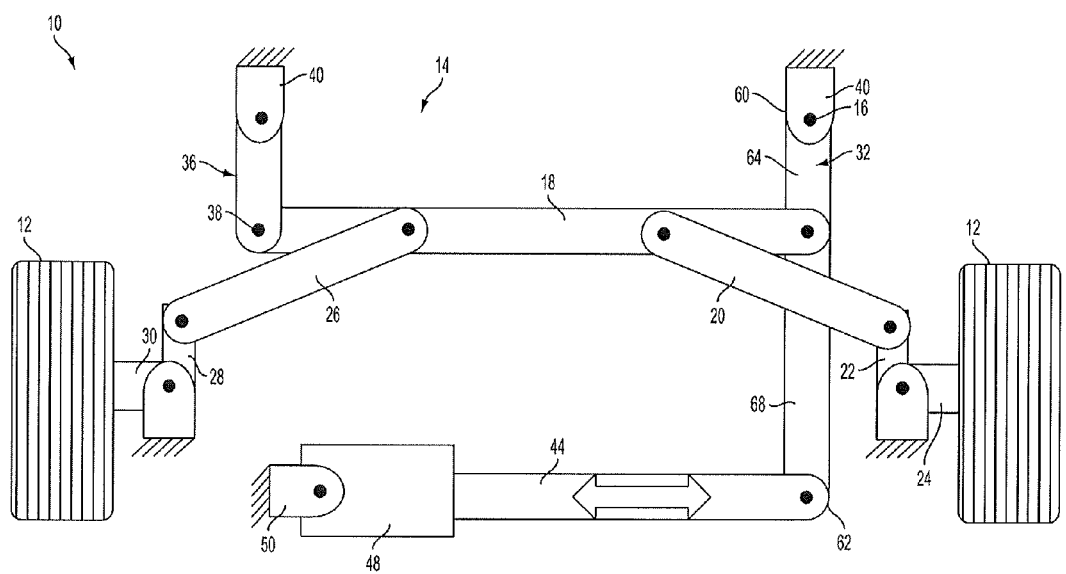
FIG. 5 is a schematic illustration of a power steering system according to yet another aspect of the invention.

Referring now to FIG. 5, the steering system 10 is schematically illustrated according to yet another embodiment. The linkage arrangement 14 includes the first linkage arm 32 that is pivotally coupled to the cross-link member 18 at a location proximate the first shaft 16. The first linkage arm 32 is pivotally coupled to the frame of the vehicle via the first pivot joint 34 and is free to rotate in response to an input from the first shaft 16. The second linkage arm 36 is also pivotally coupled to the cross-link member 18 at a pivot location 38. The second linkage arm 36 is pivotally coupled to the frame of the vehicle via the second pivot joint 40.

In the illustrated embodiment, the first linkage arm 32 is elongated to extend away from a first end 60 of the first linkage arm 32 proximate the first pivot joint 34 and past the cross-link member 18 to a second end 62 of the first linkage arm 32. The first linkage arm 32 is pivotally coupled to the linkage member 44 proximate the second end 62 of the first linkage arm 32. The linkage member 44 extends from the first linkage arm 32 to the electric actuator 48 that is operatively coupled to the frame of the vehicle. The operative coupling of the electric actuator 48 to the frame comprises a pivotal connection via the pivot joint 50. In the illustrated embodiment, the electric actuator 48 comprises a linear actuator that translates the linkage member 44 in a substantially cross-car direction of the vehicle.

As discussed above in relation to alternative embodiments, the first linkage arm 32 comprises two portions. A first portion 64, which may be referred to herein as a power portion, extends from the first end 60 of the first linkage arm 32 to the pivotal connection between the first linkage arm 32 and the cross-link member 18 at the location of the first shaft 16. A second portion 68, which may be referred to herein as an assist portion, extends from the second end 64 of the first linkage arm 32 and the pivotal connection between the first linkage arm 32 and the cross-link member 18 at the location of the first shaft 16. The second portion 68 is directly driven by the linkage member 44 that is translated with the electric actuator 48. Therefore, the electric actuator 48 provides a power steering assist to the linkage arrangement 14 via the linkage member 44 and the second portion 64 of the first linkage arm 32.

Figure 6:
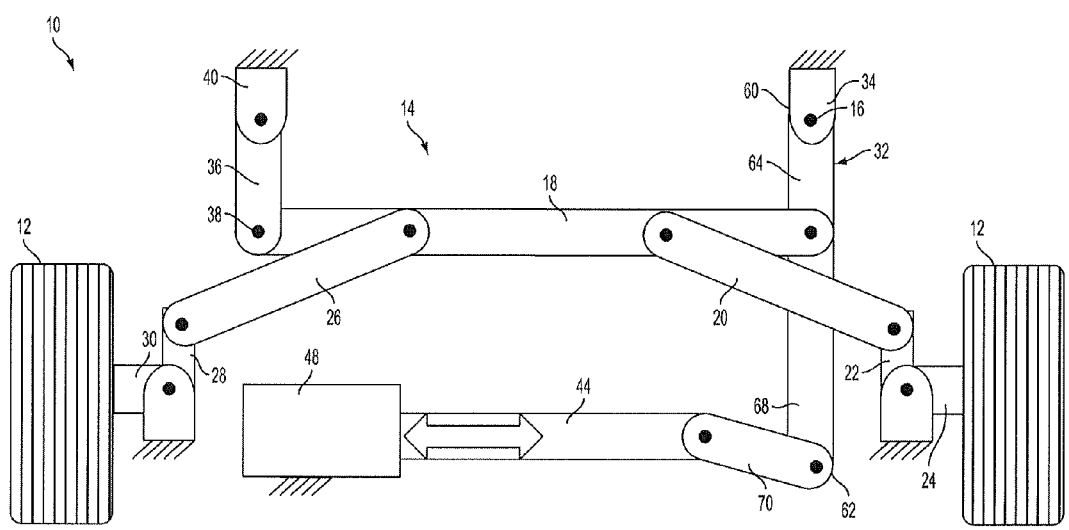
FIG. 6 is a schematic illustration of a power steering system according to yet another aspect of the invention.

Referring now to FIG. 6, the steering system 10 is schematically illustrated to show another exemplary embodiment. The illustrated embodiment is similar in many respects to the embodiment shown in FIG. 5, such that similar reference numerals are employed and duplicative description of the previously described components is not necessary.

The linkage arrangement 14 of the steering system 10 includes an intermediate linkage member 70 that extends between, and connects, the first linkage arm 32 and the linkage member 44 that is coupled to the electric actuator 48. The intermediate linkage member 70 is pivotally coupled to the first linkage arm 32 and the linkage member 44, thereby allowing a direct mounting of the electric actuator 48 to the frame of the vehicle.

As is the case with the embodiments described above with respect to FIGS. 3 and 4, the first portion 60 and the second portion 62 of the first linkage arm 32 of FIGS. 5 and 6 may be arranged in common or distinct planes and/or may be angularly displaced from each other at any angle in the 360 degree spectrum.

Figure 7:
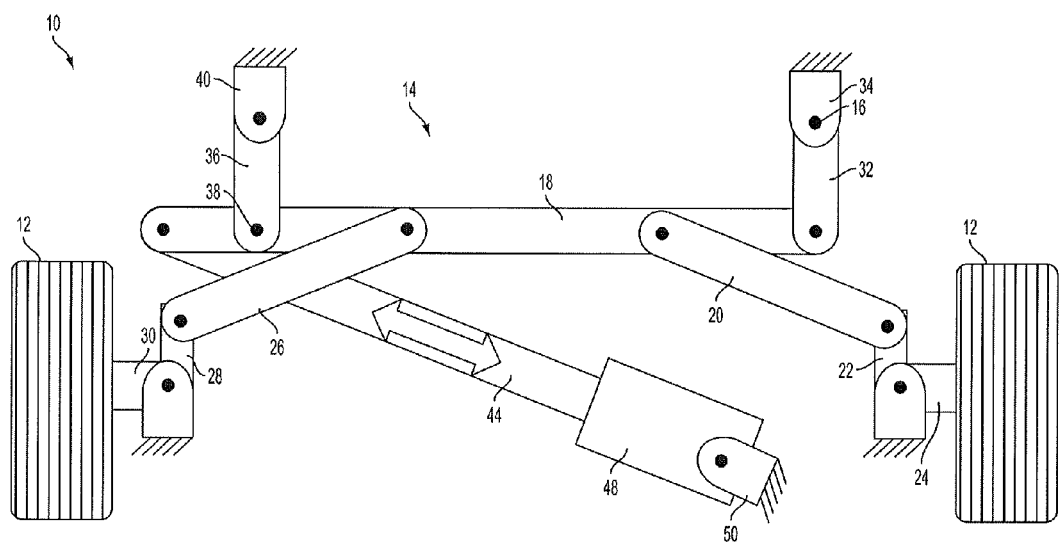
FIG. 7 is a schematic illustration of a power steering system according to another aspect of the invention.

Referring now to FIG. 7, the steering system 10 is schematically illustrated in accordance with another aspect of the invention. The illustrated embodiment is similar in many respects to the embodiments described above, such that similar reference numerals are employed and duplicative description of the previously described components is not necessary.

In the illustrated embodiment, the linkage member 44 extends from the electric actuator 48 and is directly coupled to the cross-link member 18. It is to be understood that coupling of the linkage member 44 to the cross-link member 18 may be present along any portion of the cross-link member 18. The illustrated coupling location is merely illustrative and is not intended to be limiting. The first linkage arm 32 and the second linkage arm 36 extend between their respective pivot joints 34, 40 and the cross-link member 18.

Advantageously, each above-described embodiment of the steering system 10 allows a currently manufactured parallelogram linkage arrangement to be integrated with the electric actuator 48 and associated linkage member 44 that provides electrical assist to the steering system. Particularly advantageous is the location of the power steering assist that is transferred to the overall linkage arrangement. Specifically, the power assist load is added to the linkage arrangement at a separate location from the command load location, with such a command load being proximate the first linkage arm 32 in one embodiment. Additionally, packaging freedom is achieved by optionally elevating the second portion 54 (i.e., assist portion) relative to the first portion 52 (i.e., power portion), thereby changing the planes that the portions are located in. Such a configuration allows the electric actuator 48 to be mounted at any height in the vehicle simply by customizing the length of the shaft connecting the first portion 52 and the second portion 54. Modification of the angular orientation of the portions provides yet another degree of packaging freedom.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, what is claimed is:

1. A power steering system comprising:
    a first linkage arm pivotally coupled to a cross-link member extending in a transverse direction;
    a first shaft generally orthogonal to the first linkage arm and configured to rotate the first linkage arm;
    a second linkage arm pivotally coupled to the cross-link member at a pivot location, the second linkage arm comprising:
        a power portion extending from a first end of the second linkage arm to the pivot location; and
        an assist portion extending from the pivot location to a second end of the second linkage arm, the power portion of the second linkage arm and the assist portion of the second linkage arm being located in distinct planes, the power portion of the second linkage arm and the assist portion of the second linkage arm angularly displaced from each other at an angle greater than 0 degrees and less than 360 degrees;
    an electric actuator; and
    a linkage member extending from the electric actuator and operatively coupled to the assist portion of the second linkage arm to reduce the steering effort required by a driver of the vehicle, the first linkage arm being coupled to the cross-link member at a first location, the second linkage arm is coupled to the cross-link member at a second location spaced from the first location, and the power steering system further comprises a pair of tie rods, each of the tie rods rotatably coupled to the cross-link member at respective first ends and operatively coupled proximate respective second ends to a pair of wheels and configured to impart pivoting of the pair of wheels, each of the tie rods coupled to the cross-link member at locations of the cross-link member that are between the first location and the second location of the cross-link member.

2. The power steering system of claim 1, wherein the linkage member is directly coupled to the second linkage arm.

3. The power steering system of claim 2, wherein the electric actuator is pivotally connected to the frame of a vehicle with a pivot joint.

4. The power steering system of claim 1, further comprising an intermediate linkage rotatably coupled to the linkage member and rotatably coupled to the second linkage arm.

5. The power steering system of claim 4, wherein the electric actuator is directly mounted to the frame of a vehicle.

6. The power steering system of claim 1, wherein the electric actuator comprises a linear actuator.

7. The power steering system of claim 1, wherein the power portion of the second linkage arm and the assist portion of the second linkage arm are angularly displaced from each other at about 180 degrees.

* * * * *